June 14, 1949.  S. E. VICKERS  2,473,485
THERMAL OVERLOAD DEVICE
Filed Jan. 6, 1948
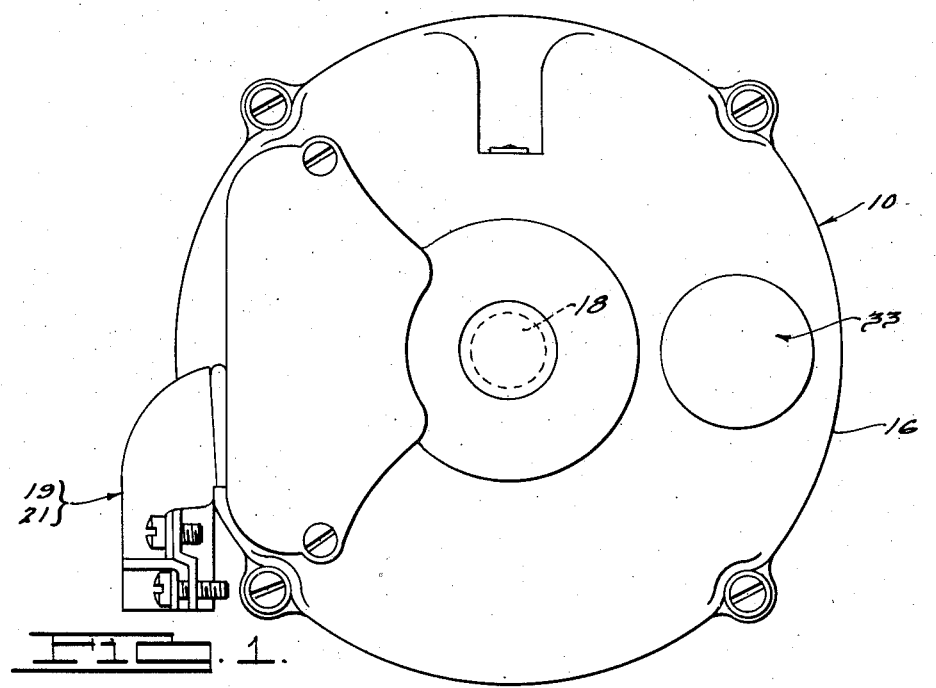
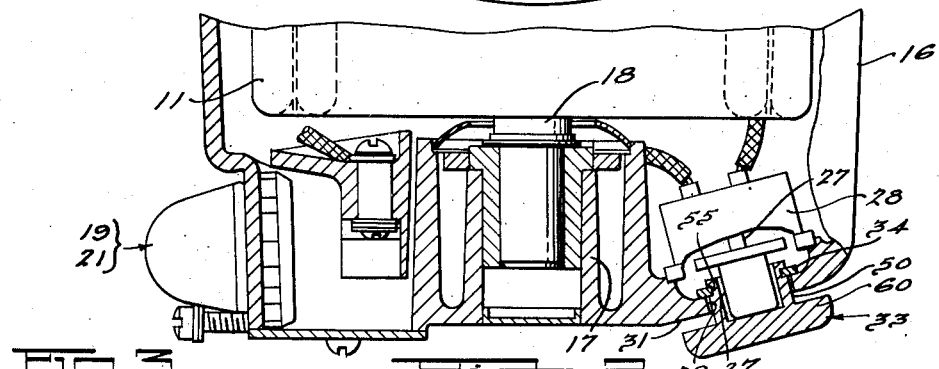
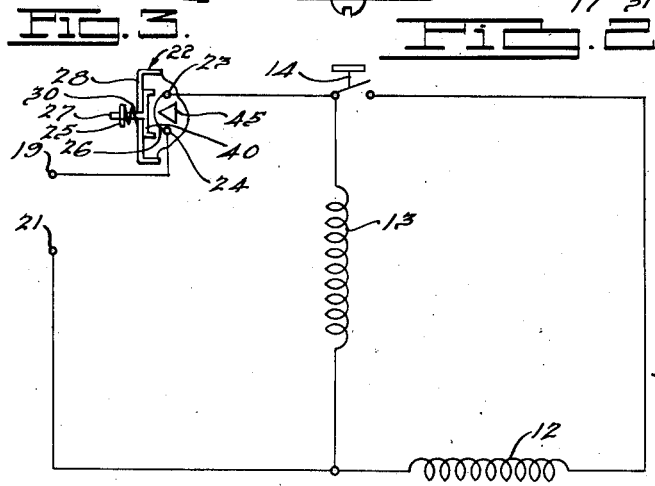
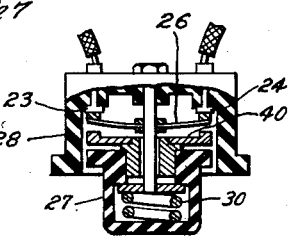
INVENTOR.
Samuel Ernest Vickers.
BY
E. J. Balluff
ATTORNEY.

Patented June 14, 1949

2,473,485

UNITED STATES PATENT OFFICE 2,473,485

THERMAL OVERLOAD DEVICE

Samuel Ernest Vickers, Bloomington, Ill., assignor to Eureka Williams Corporation, Bloomington, Ill., a corporation of Michigan Application January 6, 1948, Serial No. 733

4 Claims. (Cl. 171—252)

This invention relates to electrical devices adapted to be employed in circuits employing thermal overload devices for preventing injury or destruction of any such electrical device in the event of the operation thereof under conditions wherein the temperature of the device exceeds a predetermined safe operating limit for which such device may have been designed.

An object of the invention is to provide operating or actuating means for the thermal overload device which will permit the electrical circuit through the overload device to be opened but which will make it difficult to the point of practical impossibility for the overload device to be held or wedged in circuit closing position in which the overload device is inoperative for the purpose of discontinuing the operation of the electrical device when such may be required by abnormal operating conditions therein.

Other and further objects of the invention will be apparent by reference to the accompanying drawings of which there is one sheet, which, by way of illustration, shows a preferred embodiment and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

Referring to the drawings:

Fig. 1 illustrates an end elevational view of an electric motor employing a thermal overload protective device having operating means embracing the principles of the invention.

Fig. 2 is a fragmentary horizontal cross-sectional view of the motor and overload device illustrated by Fig. 1. Fig. 2 is taken substantially in the plane of the axis of the motor illustrated by Fig. 1.

Fig. 3 is a wiring diagram of the electrical elements embraced in the structure illustrated by Figs. 1 and 2.

Fig. 4 is a sectional view of the thermal switch with the circuit closed.

With reference to all of the figures of the drawing, the numeral 10 indicates generally an electrical motor or device which in the present instance is a split phase motor, although the invention is not limited to motors of this type but may be employed on any electrical device where the problem of overload protection is presented.

The motor 10 has a stator 11 including a starting winding 12 and a running winding 13, the starting winding 12 being cut out of the circuit of the motor by a centrifugal switch 14 which is connected in series with the starting winding 12. The centrifugal switch 14 may be of any suitable type, as for example, the kind of centrifugal switch which is disclosed by the pending application of Hammell and O'Malley, Serial No. 676,885, filed June 15, 1946, for "Centrifugal switch."

The motor 10 also includes a motor casing 16 having bearings 17 formed therein in which rotor shaft 18 is mounted for rotation. Electric energy is supplied to the starting and running windings 12 and 13 respectively by terminals indicated at 19 and 21. On the side of the line which includes the centrifugal cut-out switch 14 and between this switch and the terminal 19 is connected in series a thermal overload protective device indicated generally at 22. The protective device 22 includes contacts 23 and 24 between which a bi-metallic bar or disk 26 is adapted to close the electrical circuit through the overload device when normal operating conditions are found to exist within the motor 10. However, when any condition arises in the circuit in which the motor 10 is employed that causes the temperature of the motor 10 to increase beyond safe and conventional operating limits, then the bi-metallic element 26 will respond to the temperature of the motor to such an extent as to move by snap-action away from either one or both of the contacts 23 and 24 to open the electrical circuit of the motor 10. Such a condition might arise in the event an excessive load is placed upon the motor 10 or the motor 10 is called upon to operate under a low voltage condition of the power source.

The thermal overload device 22 is provided with an actuating member indicated at 27 adapted to be resiliently held in an extended position away from the thermally responsive element 26 by a spring 30. The spring 30 is disposed between a stop 25 formed on the actuating member 27 in spaced relation to a casing 28 in which the thermally actuated device 22 is located. When the actuating member 27 is so extended by the spring 30, the actuating bar 40 of the actuating member 27 is adapted to seat against the interior surface of the casing 28.

It will be apparent from Fig. 2 that the actuating bar 40 will be engaged by the thermally responsive element 26 whenever the element 26 is heated enough to cause the snap-action movement previously referred to which opens the circuit between the contacts 23 and 24. After such opening movement, however, it will be apparent that by applying a force to the actuating member 27 the spring 30 may be compressed and the actuating bar 40 may be moved far enough inwardly of the casing 28 to reverse the curvature of the thermally actuated element 26 whenever the element 26 is cool enough to permit such reversal of curvature. Hence, if normal operating conditions have been restored within the motor 10 and the actuating member 27 has been moved inwardly far enough to move the thermally actuated element 26 by snap-action into contact closing position, then the motor thereafter will continue to operate under normal operating conditions. However, if such normal operating conditions have not been restored sufficiently to permit the required amount of cooling of the actuated element 26, then inward movement of the actuating member 27 will merely compress the thermally responsive element 26 against stop 45 but without reversing the curvature of the thermally actuated element 26. Under such circumstances the motor 10 will remain inoperative until cooling of the motor has continued long enough for the curvature of the thermally actuated element 26 to be reversed by the actuation of the actuating member 27.

The closing and opening of the circuit between the contacts 23 and 24 may be repeated as many times as the actuating member may be moved inwardly after the cooling of the bi-metallic element 26 as previously described and the motor 10 will not be injured. However, occasions may arise when persons not familiar with the size or capacity of the motor 10 may conclude that it would be desirable to prevent the thermal overload device 22 from operating. To accomplish this result such persons might attempt to foul or jam the actuating member 27 in such position as to prevent the operation of the thermally responsive member 26 to open the circuit between the contacts 23 and 24. Under ordinary conditions it might be possible to so foul or jam the actuating member 26 by wedging matches, sticks, or other small devices around the actuating member 27.

To prevent such fouling or jamming of the actuating member 27, the overload protective device 22 is disposed in a small casing indicated at 28, this casing being secured within the motor casing 10 inside an opening 29 which is formed in the casing 10. The actuating member 27 for the overload protective device 22 projects outwardly of the casing 28 and the casing 16 through the opening 29. The motor casing 16 around the opening 29 is provided with a planular surface indicated at 31 which is perpendicular to the axis of movement of the actuating member 27. The portion of the casing 16 on which the surface 31 is formed provides a cover for closing the casing 28 except for the opening 29 which is formed therethrough.

The operating button 33 has a sleeve portion 50 which projects inwardly of the opening 29 and is there provided with a circumferential groove 55 in which a snap ring indicated at 34 is disposed. The snap ring 34 projects outwardly with respect to the sleeve 50 to provide a circular flange which extends beyond the opening 29 inside of the casing 16. When the actuating member 27 is fully extended by the spring 30, the flange 34 engages the inside surface of the casing 16 to provide a stop for limiting the outward movement of the actuating member 27. Outside the casing 16 the button 33 is formed to provide an integral enlarged flange 60 which extends a considerable distance outwardly beyond the circumferential extent of the opening 29 and the inner surface of which flange is spaced far enough from the planular surface 31 to permit a sufficient movement of the button 33 to effect the previously described contact closing movement of the actuating member 27. The operation of the spring 30 normally holds the flange 60 in such spaced relation to the surface 31 with the flange 34 engaging the inner surface of the casing 16.

It will be noted that the flanges 34 and 60 are in such position relative to the opening 29 that matches, sticks, or pins cannot be inserted in the opening 29 and projected beyond the flange 34 in such manner as to wedge the actuating member 27 in its inner contact closing position.

Also, it should be stated that when the operating button 33 is depressed inwardly for resetting the thermally actuated member 26 that the space between the flange 60 and the surface 31 is of less width than the clearance between the opening 29 and the sleeve 50. This makes it impossible to wedge any foreign object between the sleeve 50 and opening 29 when the button 33 has been actuated to switch resetting position.

In Fig. 2 the actuating member 27 is in its normal operative position and this position is the position in which the actuating member 27 and button 33 remain regardless of the position of the thermally actuated element 26. In other words, the thermally actuated member 26 may snap into a position opposite that illustrated in Fig. 3 as a result of unusual temperature conditions within the motor 10 without affecting the position of the actuating member 27 as such position is illustrated in Fig. 2. However, if the curvature of the thermal element 26 is reversed by such unusual temperature conditions within the motor 10, then the snap-action movement of the element 26 will open the circuit between the contacts 23 and 24 and the motor 10 will stop. When normal operating conditions have been restored within the motor 10, however, the thermal element 26 will cool enough so that if the button 33 is depressed toward the surface 31 the actuating member 27 will be moved enough to reverse the curvature of the element 26 under the conditions referred to.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. An electrical device comprising a casing having electrically energized means therein, a thermal overload device associated with said casing and responsive to the temperature of said means, said thermal overload device having a temperature responsive switch for opening a circuit through said electrically energized means above a predetermined safe operating temperature for said electrically energized means, a reset member projecting through an opening in said casing for movement inwardly of said casing for closing and resetting said switch, said overload device comprising resilient means for opposing said inward movement and for holding said reset member normally in an extended position within said opening, and actuating means for said reset member, said actuating means comprising a body covering the end of said reset member and disposed within said opening and closing said opening against access to said reset member from externally of said casing.

2. An electrical device comprising a casing having electrically energized means therein, a thermal overload device associated with said casing and responsive to the temperature of said means, said thermal overload device having a temperature responsive switch for opening a circuit through said electrically energized means above a predetermined safe operating temperture for said electrically energized means, a reset member projecting through an opening in said casing for movement inwardly of said casing for closing and resetting said switch, said overload device comprising resilient means for opposing said inward movement and for holding said reset member normally in an extended position within said opening, and actuating means for said reset member, said actuating means comprising a body covering the end of said reset member and disposed within said opening and closing said opening against access to said reset member from externally of said casing, said body having an outwardly disposed flange projecting therefrom externally of said casing covering said opening.

3. An electrical device comprising a casing having electrically energized means therein, a thermal overload device associated with said casing and responsive to the temperature of said means, said thermal overload device having a temperature responsive switch for opening a circuit through said electrically energized means above a predetermined safe operating temperature for said electrically energized means, a reset member projecting through an opening in said casing for movement inwardly of said casing for closing and resetting said switch, said overload device comprising resilient means for opposing said inward movement and for holding said reset member normally in an extended position within said opening, and actuating means for said reset member, said actuating means comprising a body covering the end of said reset member and disposed within said opening and closing said opening against access to said reset member from externally of said casing, said body having an inwardly disposed flange projecting inwardly of said casing for preventing access to said reset member through said opening.

4. An electrical device comprising a casing having electrically energized means therein, a thermal overload device associated with said casing and responsive to the temperature of said means, said thermal overload device having a temperature responsive switch for opening a circuit through said electrically energized means above a predetermined safe operating temperature for said electrically energized means, a reset member projecting through an opening in said casing for movement inwardly of said casing for closing and resetting said switch, said overload device comprising resilient means for opposing said inward movement and for holding said reset member normally in an extended position within said opening, and actuating means for said reset member, said actuating means comprising a body covering the end of said reset member and disposed within said opening and closing said opening against access to said reset member from externally of said casing, said body having spaced outwardly disposed flanges projecting therefrom internally and externally of said casing at opposite extremities of said opening, said resilient means normally holding said internally disposed flange against said casing to prevent the locking of said actuating means against said resilient means when said switch is reset before said overload device has cooled below said safe operating temperature.

SAMUEL ERNEST VICKERS.

The following references are of record in the file of this patent:

UNITED STATES PATENTS

| Number | Name | Date |
|---|---|---|
| 1,767,709 | Smith | June 24, 1930 |
| 1,930,539 | Renshow et al. | Oct. 17, 1933 |
| 1,987,662 | Blotz | Jan. 15, 1935 |
| 2,213,889 | Schaefer | Sept. 3, 1940 |